Feb. 17, 1931.                J. F. RUNGE                1,793,017
                          GRAIN CLEANER AND GRADER
                   Filed Feb. 27, 1928          2 Sheets-Sheet 1
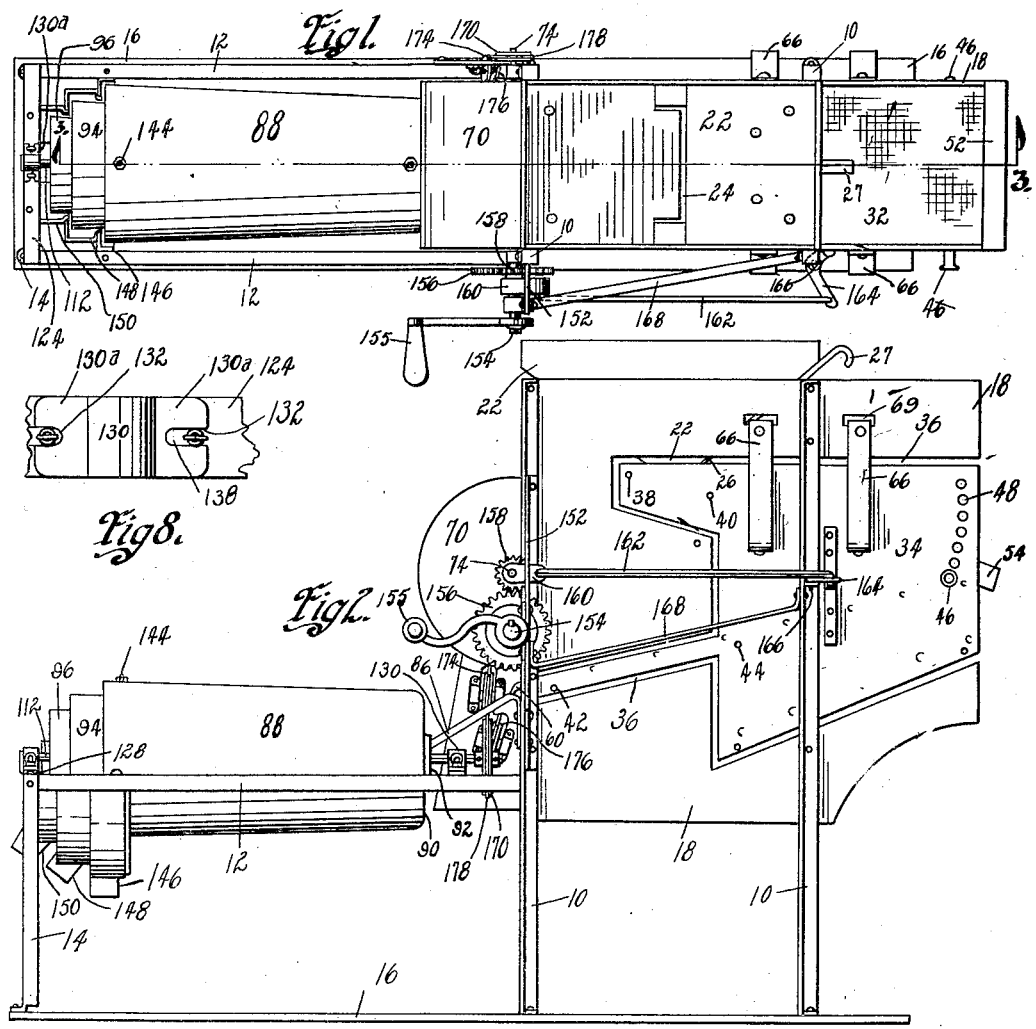
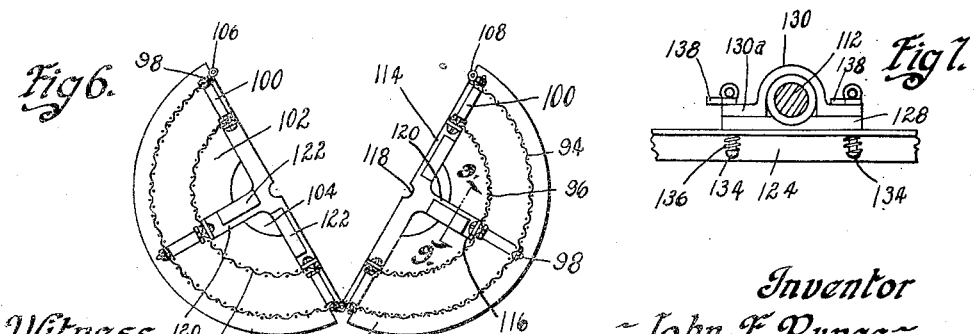
Witness
Phil Harrison
Inventor
John F. Runge
by Bair & Freeman Attorneys

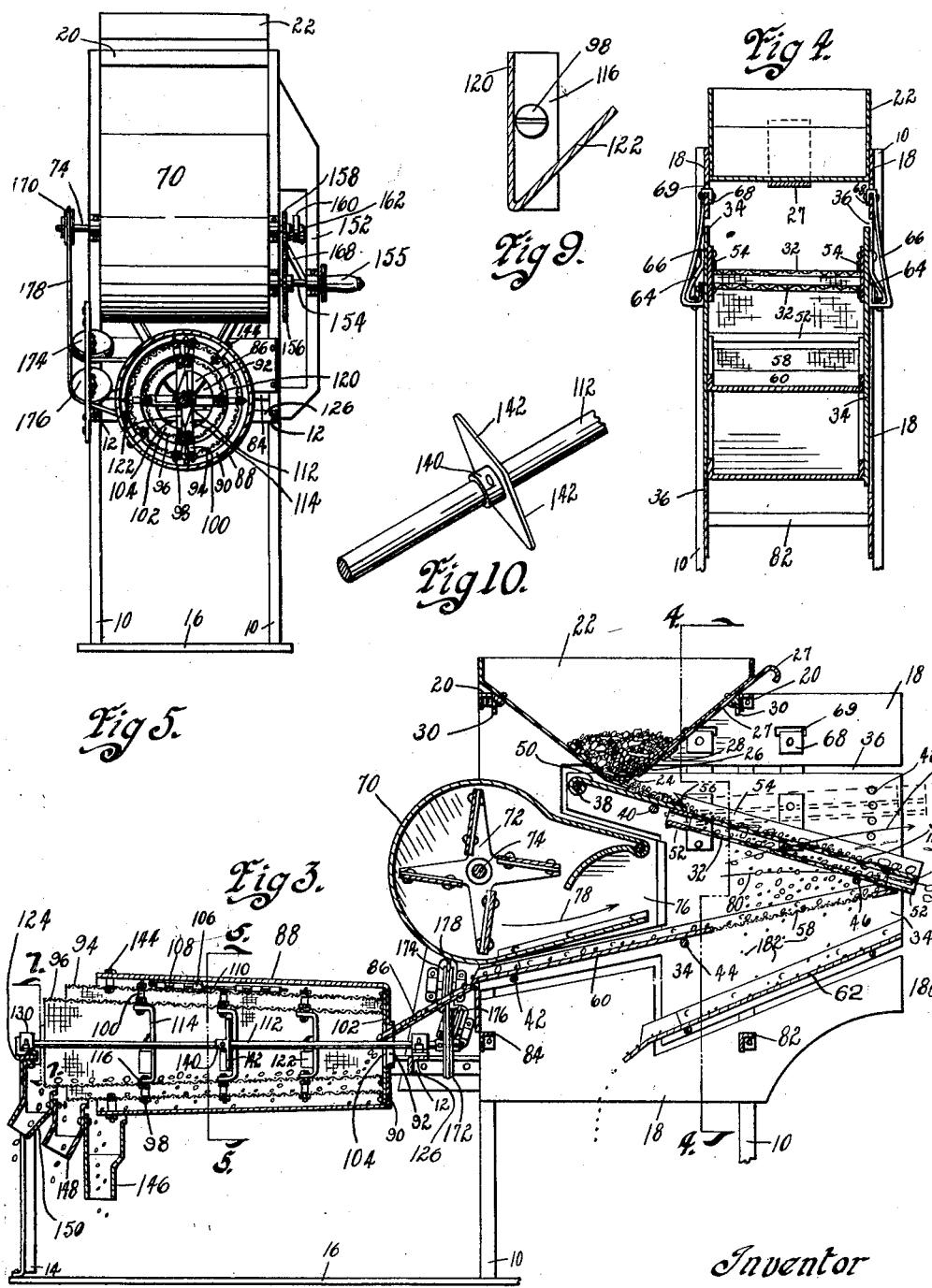

Patented Feb. 17, 1931

1,793,017

UNITED STATES PATENT OFFICE

JOHN F. RUNGE, OF SPENCER, IOWA

GRAIN CLEANER AND GRADER

Application filed February 27, 1928. Serial No. 257,238.

The object of my present invention is to provide a grain cleaner and grader of simple, durable and inexpensive construction.

It is my purpose to provide such a grain cleaner and grader that can be made in different sizes for hand or power operation and for cleaning and grading a great variety of seeds in such quantities as may be desired.

Another purpose of my invention is to provide numerous novel features of construction, including features whereby the shaker screens are mounted and operated.

Another purpose is to provide a novel form of removable and interchangeable grader cones, and means for operating the same, whereby the machine can be readily adapted for cleaning and grading different kinds of seed.

With these and other objects in view, my invention consists in the construction, arrangement and combination of the various parts of my grain cleaner and grader, whereby the objects contemplated are attained, as hereinafter more fully set forth, pointed out in my claims, and illustrated in the accompanying drawings, in which:

Figure 1 is a top or plan view of a grain cleaner and grader embodying my invention.

Figure 2 shows a side elevation of the same.

Figure 3 is a detail, sectional view taken on the line 3—3 of Figure 1.

Figure 4 is a detail, sectional view taken on the line 4—4 of Figure 3.

Figure 5 is a detail, sectional view taken on the line 5—5 of Figure 3.

Figure 6 is a front elevation of one of the removable cone units.

Figure 7 is a detail, sectional view taken on the line 7—7 of Figure 3.

Figure 8 is a plan view of one of the bearings for the cone shaft.

Figure 9 is a detail, sectional view taken on the line 9—9 of Figure 6; and

Figure 10 is a perspective view of one end of the grader cone shaft.

My improved machine comprises suitable supporting frame members in the form of uprights indicated generally by the reference character 10, of which there are four arranged preferably in a square.

Extending rearwardly from two of the members 10 are the side frame members 12, which at their front ends have the supporting legs 14.

The whole device may or may not be provided with a base 16.

Suitably supported on the upright members 10 are laterally spaced side plates 18, which form casing members for the shaker screen assembly. Extending across the device between the upper parts of the side members 18 are cross bars 20, which detachably support the hopper 22. The hopper 22 has in its bottom a discharge opening 24.

For adjustably controlling the size of the opening 24, I provide a closure member 26, having a handle 27 slidably mounted in a guide 28. Secured to the under side of the hopper 22 are angle bars 30, which coact with the cross bars 20 for holding the hopper in proper position.

The controlling handle 27 is also slidably mounted between one of the bars 30 and the bottom of the hopper 22.

Arranged to receive grain or seed discharged from the opening 24 in the hopper 22, I provide shaker screens 32, which are part of a shaker screen assembly, which will now be described.

This assembly comprises a pair of spaced side wall members 34 of the peculiar shape shown in Figures 2 and 3, inset in corresponding openings 36 in the respective side wall members 18 for lateral reciprocation.

The side wall members 34 are connected by cross rods 38, 40, 42, 44 and 46. The rod 46 is mounted at the front of the machine and may be arranged in anyone of a series of laterally spaced pairs of holes 48.

Pivoted to the rod 38 is a hinged deck or chute member 50, which is inclined downwardly and forwardly and normally has its forward end resting on the rod 40, as shown in Figure 3.

The deck 50 stands normally just below the discharge opening 24 at the bottom of the hopper 22.

I provide detachably mounted shaker screens 32, already referred to. These screens are made in a unit, comprising a pair of superposed spaced, screen members carried by a frame, having the transverse elements 52 and the longitudinal frame members 54.

The rearward ends of the side members 54 have notches 56 (see Figure 3), which receive the forward edge of the deck 50 and the forward end of the shaker screen unit rests on the rod 46.

I find that the shaker screen assembly can be held by friction between the walls 34 against accidental displacement, but other fastening means may be employed if necessary, for instance by connecting the side members 54 of the shaker screen unit with the deck member 50.

The deck member 50 and the shaker screens are ordinarily used in such an arrangement that they are inclined from the rod 38 downwardly and forwardly in the machine.

Arranged below the shaker screen and inclined from the forward end of the machine downwardly and rearwardly is a cross screen 58 from which grain or the like is discharged upon a solid bottom member 60 extended from the lower rearward end of the screen 58 substantially in the same plane rearwardly and downwardly, as shown in Figure 3.

Below the screen 58 is an inclined bottom member 62, arranged between the side walls 34 for discharging dirt and very small seed and the like.

The shaker screen unit is mounted for lateral reciprocation in the following manner:

On the outer surfaces of the side walls 34 are mounted projecting members 64. Flat resilient members 66 are hung on the side members 18, as by means of hook-shaped portions 68 projecting through slots 69 and thence inclined downwardly and outwardly, as shown in Figure 4, and around the outer portions of the members 64 and thence inwardly laterally toward and preferably to the walls 34.

The lower parts of the spring members 66 may be secured to the members 64 or to the walls 34 or to both. Their resiliency tends to hold the shaker screen unit at its central position.

The mechanism for reciprocating the shaker screen unit will be hereinafter described.

Located rearwardly and below the discharge opening 24 of the hopper 22 is a fan casing 70, in which a fan 72 is mounted on a transversely supported shaft 74.

The fan casing 70 has a discharge mouth 76 located slightly forwardly with relation to and below the opening 24 in such manner as to discharge forwardly and slightly upwardly in the machine as indicated by the arrows at 78 and 80.

The forward supporting members 10 are connected by an angle iron brace 82 and the rearward members 10 are supported by an angle iron brace 84.

Suitably supported on the frame of the machine at the discharge end of the bottom member 60 is a short chute 86, which discharges into the central, upper end of the grading unit. One of these grading units, I will now describe. I use different units for handling different kinds of grain.

Each unit comprises an outer, imperforate tubular member 88, having the form generally of a hollow, truncated cone with its larger end at the rear part of the machine and with its smaller, forward end provided with the end closure member 90, having the central opening 92 to receive grain discharged from the chute 86.

The imperforate cone 88 is used with a pair of inner conical screens. The inner conical screens are detachable from the cone 88, so as to make it possible to use inner conical screens with different sizes of perforations or meshes of screen for different kinds of grain.

In Figures 2, 3, 5 and 6, I have illustrated the conical screens and in Figures 7, 8, 9 and 10 certain details of their structure.

The inner conical screens really consist of an outer conical screen 94 of foraminous material. This may be either meshed wire, a perforated sheet or otherwise.

The conical screen 94 has the form of a truncated cone and is designed to fit inside the cone 88, spaced from the wall thereof, as shown in Figure 3.

Within the conical screen 94 is a similar, inwardly spaced, smaller conical screen 96.

The conical screens 94 and 96 are connected together by means of bolts 98 on which between the cones are the spaced sleeves 100.

At the forward, smaller end of the conical screens 94 and 96, they are provided with a disc 102, having a central opening 104 to register with the hole 92 in the rear end of the cone 88.

As shown in Figure 6, the conical screens 94 and 96 are made in separate halves. The halves of the conical screen 94 may be secured together in any suitable way.

As here shown, the halves of the conical screen 94 are provided along their adjacent edges with coacting hinge members 106 and 108, having the rolled or tubular portions to receive a long locking rod or pintle 110 (see Figures 3 and 6).

If the locking rod 110 on one side is withdrawn and the one on the other side is left in position, the conical screens 94 and 96 may be swung to open position, as on a hinge (see Figure 6).

It will, of course, be understood that the end disc 102 is likewise made in halves.

On the inside of the halves of each conical screens 94 and 96, I provide a series of members, which serve a triple purpose, to-wit, as means by which the conical screens 96 and 94 may be mounted on their shaft 112, bracing and reinforcing means for the cones, and means for advancing the grain in the inner cone.

Referring to Figure 6, it will be seen that extending substantially diametrically across the open part of each half of the member 96 is a brace or the like 114, which may have the angle foot 116 mounted on one of the bolts 98. At the middle of the brace 114 is a notch 118 to receive the shaft 112. Extending from the central portion of the brace 114 radially outward at a ninety degree angle of the brace 114 is a brace member 120 with a foot 116 similar to that already described, preferably mounted on one of the bolts 98.

The braces 114 and 120 are provided with flanges 122 inclined at a substantially forty-five degree angle, which serve as wings for helping to advance the grain toward the discharge end of the cone.

The conical screen 94 is slightly longer than the cone 88 and projects from the rear end thereof, and the conical screen 96 is slightly longer than the conical screen 94, and projects beyond the rear end thereof. This is for convenience in controlling the discharging grain.

The assembly comprising the conical screens 94 and 96 and the parts for connecting them together and mounting them on the shaft 112 are made separable from the shaft and the cone 88, so that different units may be employed for different kinds of grain.

The shaft 112 is journaled in bearings on transverse frame members 124.

In Figure 7, I have shown one of these bearings in detail. Each bearing comprises a lower bearing member 128 mounted on one of the frame members, as for instance the frame member 124 and fixed thereto. Above the bearing member 128 is the upper removable journal or bearing member 130. The bearing member 130 (see Figures 7 and 8) has laterally projecting feet 130a having the elongated slots 132. Mounted in the bearing member 128 and the frame member to which it is attached are the vertically slidable locking bolts or rods 134 normally held in their lower positions of movement by means of springs 136.

At the upper parts of the locking bolts 134 are lateral projections or fingers 138.

The parts are so arranged that when the removable bearing member 130 is installed in position on the bearing member 128, the locking bolts 134 may be moved to different positions. The right-hand bolt in Figures 7 and 8 is turned to positions where the projection 138 extends over the foot 130a, while the left-hand bolt has been adjusted to position where it registers with the slot 132.

When the bolts are in their position shown at the left-hand parts of Figures 7 and 8, it will be seen that the bearing member 130 may be removed while when the bolts are in their position shown at the right-hand sides of said figures, the bearing 130 will be locked in place for journaling the shaft 112.

The shaft 112 has on it at intervals corresponding to the spacing of the successive braces 114 lengthwise of the cone 96, collars 140 from which project oppositely extending fingers 142 adapted to coact the braces 114 and flanges 122 by entering the channel formed by said braces and flanges, so that when the shaft is rotated, the cone assembly will be rotated with it.

I shall briefly describe the manner of assembling one of the cone grader units and in this connection the construction thereof will perhaps more clearly appear.

Assume that it is desired to grade seed of a certain kind.

The assembly which has the conical screens 94 and 96 with the proper sized perforations for the purpose is selected. The shaft 112 is placed in the notches 118 and the cone halves are swung together from the position shown in Figure 6 to position for instance shown in Figures 3 or 5.

The assembly consisting of the conical screens 94 and 96 in the shaft 112 is then shoved lengthwise into the cone 88. The conical screen 88 is locked to the outer cone 94 by means of bolts 144 (see Figure 3).

The end disc 102 is of greater diameter than the small end of the conical screen 94 and fits just inside the small end of the cone 88. It thus serves to keep the cone 88 properly centered on the conical screen 94.

The entire cone and conical screen assembly is then lifted and set into place with the shaft 112 received in the bearing members 128, after which the bearing members 130 are assembled in place.

The frame at the rear end of the conical screen grader assembly is provided with a plurality of discharge chutes 146, 148 and 150 for receiving grain or seed discharged from the cone 88, and the conical screens 94 and 96 respectively.

I shall now describe the gearing connections for my improved grain cleaner and grader.

Supported on the frame of the machine as shown in Figures 1, 2 and 5 is a bracket 152. Suitably mounted on the bracket 152 and the frame of the machine is a stub shaft 154 on the outer end of which is a crank handle 155. On the shaft 154 is a gear 156, which meshes with a small pinion 158 on the fan shaft 74.

It will thus be seen that by rotating the shaft 154 through the operation of the crank handle 155 or from any source of power, rotation will be imparted through the gear and pinion 156 and 158 to the fan shaft 74 and the fan. On the shaft 74 is a short arm 160 to which is pivoted one end of a pitman 162 projecting forwardly in the machine.

The central portion of a bell crank lever 164 is pivoted as at 166 on the frame of the machine adjacent to the shaker screen unit already described. The forward end of the pitman 162 is pivoted to one arm of the bell crank lever 164 and the other arm of that lever is pivoted to one of the walls 34 of the shaker screen assembly.

The member 168 is a brace for the bracket 152.

The shaft 112 and the conical grader screens are operated from the shaft 74 in the following manner: On the opposite end of the shaft 74 from that having the pinion 158 is a belt pulley 170. On the shaft 112 is a belt pulley 172 (see Figures 2, 3 and 5). Supported on the frame of the machine below the belt pulley 170 are belt pulleys 174 and 176, shown for instance in Figure 5, inclined at proper angles. A belt 178 is extended over the pulley 170 around the respective pulleys 174 and 176 and around the pulley 172.

I shall now describe somewhat in detail the operation of my improved machine.

Assuming that a certain kind of seed is to be cleaned and graded, for example, wheat, the operator, as result of his experience, adjusts the closure member 26 for fixing the size of the opening 24 for the proper discharge of wheat to the machine. He then selects the proper shaker screens for wheat and mounts them in the shaker screen assembly.

Then he adjusts the forward ends of the shaker screens by raising or lowering the rod 46 and inserting it in the proper holes 48. He then selects the proper grading conical screen 94 and 96 and assembles them in the cone 88 on the shaft 112 in the manner heretofore described.

Grain is supplied to the hopper 22 and when the shaft 154 is rotated, motion will be imparted to the shaft 74. The fan is thus operated for blowing a blast of air from the fan casing through the screens 32 as indicated by the arrows at 78 and 80. The rotation of the shaft 74 also imparts reciprocating movement to the pitman 162 for reciprocating the bell crank lever 164 (see Figures 1 and 2), and thus imparting to the shaker screen unit a lateral, reciprocating movement.

The lateral shaking movement of the shaker screens agitates the grain at the discharge end of the hopper and causes the grain to travel downwardly over the deck 50 and the shaker screens 32. The very coarse content indicated as at 180 (Figure 3) passes over the screens 32 and is discharged. Likewise the air blast will blow out fine dust and like articles, such as straw 181.

All the grain, including dirt, dust, and fine seed, passes downwardly through the screens 32 and drops upon the screen 58, which permits fine dirt and very small seeds to drop through, as indicated at 182.

The fine dirt drops upon the member 62 and is discharged.

The remaining seed travels rearwardly and downwardly on the screen 58 to the bottom or chute member 60 and is discharged down the chute 86 to the conical grader screens.

The discharge of the chute 86 is to the inside conical screen 96 through the holes 92 and 104 at the rear ends of the cone 88 and the conical screens 94 and 96.

The shaft 112 is rotated from the shaft 74 by the means hereinbefore described. The shaft 112 rotates clockwise (considering that one is looking forwardly from the rear end of the machine viewed in Figure 5).

The fingers 142 engage between the braces 114 and flanges 122 and between the braces 120 and flanges 122 for causing the cones to rotate with the shaft.

In the use of the machine now under consideration No. 1 wheat will remain in the cone 96 and be discharged from its lower end through the chute 150. It is advanced because of the rotation of the cones, and because they are larger at their discharge ends, and there is therefor a slight drop from the forward to the rear or discharge end of the cone.

Grain is also advanced by the flanges 122, which tend to kick it toward the rear end of the machine.

A slightly smaller grade of seed, perhaps No. 2 wheat, will pass through the meshes or perforations of the conical screen 96 into the conical screen 94, and will be discharged through the chute 148.

Some smaller seed, finer weed seed and the like, will pass through the meshes of the cone 94 into the imperforate cone 88 and will be discharged through the chute 146.

It will be seen from the foregoing that I have provided a comparatively simple machine, which can be used in larger or smaller sizes for hand or power operation.

By changing the shaker screens and the grading cones, the machine may be used for grading and cleaning clover seed, wheat or many other kinds of seed.

With a little experience, I find that seed can be cleaned and graded very effectively.

A machine of this kind can be made in sizes for use on ordinary farms, where it can be used for grading grain, particularly, where it is desired to remove weed seed from grain, which is to be employed for seeding purposes.

Changes may be made in the construction, and arrangement of the various parts of my improved machine without departing from the real spirit and purpose of my invention, and it is my intention to cover by my claims, any modified forms of structure or use of mechanical equivalents, which may be reasonably included within their scope.

I claim as my invention:

1. In a rotating screen structure, a shaft, spokes thereon having flanges, a finger on the shaft to coact with the flanges, the outer ends of the spokes being longitudinal with respect to the shaft, radially exending bolts through said outer ends, spacers on said bolts and a tubular screen at each end of the spacers and spaced thereby.

2. In a machine of the class described, a shaft, a grading screen unit comprising a pair of screens, one spaced within the other, spokes on said shaft, said inner screen being supported on said spokes, bolt and sleeve means for holding the two screens supported in spaced relation to each other and for fastening the inner screen to the spokes.

Des Moines, Iowa, February 9, 1928.

JOHN F. RUNGE.